United States Patent [19]

Mack

[11] Patent Number: 5,590,985
[45] Date of Patent: Jan. 7, 1997

[54] DRILL WITH PNEUMATICALLY SELF-CLEARING CHUCK

[75] Inventor: Hans-Dieter Mack, Sontheim, Germany

[73] Assignee: Gunter Horst Rohm, Sontheim, Germany

[21] Appl. No.: 411,522

[22] Filed: Mar. 28, 1995

[30] Foreign Application Priority Data

Apr. 2, 1994 [DE] Germany .......................... 44 11 523.7

[51] Int. Cl.[6] ................................................. B23B 45/00
[52] U.S. Cl. ............................... 408/56; 408/240; 279/61
[58] Field of Search ........................... 279/61, 157, 902; 408/56, 67, 124, 240; 173/75, 76, 77, 78, 79

[56] References Cited

U.S. PATENT DOCUMENTS

| | | |
|---|---|---|
| 4,607,855 | 8/1986 | Rohm . |
| 4,627,628 | 12/1986 | Rohm . |
| 4,669,932 | 6/1987 | Hartley ........................... 279/902 X |
| 4,836,563 | 6/1989 | Rohm ............................. 279/902 X |
| 4,968,191 | 11/1990 | Palm ................................ 279/61 X |
| 5,129,467 | 7/1992 | Watanabe et al. ................. 408/67 X |
| 5,172,923 | 12/1992 | Nakamura ....................... 279/157 X |
| 5,286,041 | 2/1994 | Rohm . |

FOREIGN PATENT DOCUMENTS

| | | | |
|---|---|---|---|
| 401020907A | 1/1989 | Japan ............................. 279/157 |
| 2236968 | 4/1991 | United Kingdom ............... 279/902 |

*Primary Examiner*—M. Rachuba
*Assistant Examiner*—Henry W. H. Tsai
*Attorney, Agent, or Firm*—Herbert Dubno; Andrew Wilford

[57] ABSTRACT

A drill has a drive unit having a front end and an output shaft projecting from the front end and centered on and rotatable about an axis, and a fan associated with the shaft for creating a moving stream of air traversing a location at the drive-unit front end. A chuck body fixed on the shaft is formed with a rear end juxtaposed with the drive-unit front end, an axially forwardly open tool recess on the axis, a plurality of angularly spaced and angled guides opening into the recess, and at least one passage extending between the chuck rear end and the recess. Respective jaws displaceable in the guides have front ends in the recess. An adjustment sleeve is rotatable about the axis on the body and interengaging formations on the sleeve and on the jaws displace the jaws radially on rotation of the sleeve about the axis. A deflector at the location directs the air stream into the passage for conducting the air stream through the recess so that any chips or the like in the recess will be entrained therefrom by the air stream.

20 Claims, 6 Drawing Sheets

5,590,985

DRILL WITH PNEUMATICALLY SELF-CLEARING CHUCK

FIELD OF THE INVENTION

The present invention relates to a drill. More particularly this invention concerns a drill which automatically clears chips and the like from its chuck.

BACKGROUND OF THE INVENTION

A standard drill has a drive unit having a front end and an output shaft projecting from the front end and centered on and rotatable about an axis. A chuck body fixed on the shaft is formed with a rear end juxtaposed with the drive-unit front end, an axially forwardly open tool recess on the axis, and a plurality of angularly spaced and angled guides opening into the recess. Respective jaws displaceable in the guides have front ends in the recess. An adjustment sleeve rotatable about the axis on the body engages via formations such as screwthreads with the jaws for displacing the jaws radially on rotation of the sleeve about the axis. The shaft can also axially reciprocate or be provided with a reciprocating core shaft for hammer-drill action.

It is known, for example from commonly owned U.S. Pat. Nos. 4,607,855 and 4,627,628, to form the guides as outwardly opening holes so that any chips, oil drops, or the like that accumulate in the chuck can be thrown radially off, reducing fouling of the chuck mechanism. Nonetheless fine particles can build up and form a mechanism-clogging crust in the chuck. As a result the parts become unable to move freely relative to each other for self-tightening action or the like as described in commonly owned U.S. Pat. No. 5,286,041. The clamping force of the chuck is therefore reduced.

OBJECTS OF THE INVENTION

It is therefore an object of the present invention to provide an improved drill.

Another object is the provision of such an improved drill which overcomes the above-given disadvantages, that is which prevents chips and the like from fouling the interior of the chuck.

SUMMARY OF THE INVENTION

A drill has according to the invention a drive unit having a front end and an output shaft projecting from the front end and centered on and rotatable about an axis, and a fan associated with the shaft for creating a moving stream of air traversing a location at the drive-unit front end. A chuck body fixed on the shaft is formed with a rear end juxtaposed with the drive-unit front end, an axially forwardly open tool recess on the axis, a plurality of angularly spaced and angled guides opening into the recess, and at least one passage extending between the chuck rear end and the recess. Respective jaws displaceable in the guides have front ends in the recess. An adjustment sleeve is rotatable about the axis on the body and interengaging formations on the sleeve and on the jaws displace the jaws radially on rotation of the sleeve about the axis. A deflector at the location directs the air stream into the passage for conducting the air stream through the recess so that any chips or the like in the recess will be entrained therefrom by the air stream.

Thus with this system the air stream keeps the interior of the chuck clear, either by blowing out or aspirating chips and grit, depending on the direction of the air stream. In fact the system can create a high-pressure zone inside the chuck so that chips and the like cannot settle therein but are effectively prevented from entering at all.

According to the invention the drive unit has a housing provided near the chuck with a vent and the fan expels air from the housing through the vent. The deflector is arranged between the vent and the rear end of the chuck body. The deflector can include a vent hood engaged over the vent and/or a tubular conduit leading from the vent to the rear end of the chuck body. The deflector can be fixed on the drive unit and end at a slight spacing axially rearward of the rear end of the chuck body. In this case the passage has a rear end opening on the chuck-body rear end offset from the axis and the deflector is a conduit extending from the vent and having a front end fixed relative to the drive unit and opening axially forward. The front end of the conduit and the rear end of the passage are at generally the same radial spacing from the axis. Alternately the deflector can include a rearwardly open cup fixed to the rear end of the chuck body.

The fan according to this invention can be mounted on the shaft adjacent the rear end of the chuck body, in fact fixed directly to the rear end of the chuck body. Such a fan has a plurality of blades extending radially of the shaft and an outer protector ring fixed to outer ends of the blades.

In another arrangement according to this invention the fan is inside the drive unit and the passage includes a rear part formed in and extending axially through the shaft and having a rear end opening at the fan and a front part having a front end opening into the recess. Alternately the passage includes a rear part open axially forward into one of the guides and a front part formed between the guide and the jaw. The chuck body and adjustment sleeve form an annular space into which the guides open. The passage is partially formed between the guides and the jaw so that the stream passes through the space and along the guides. In another arrangement the chuck body is formed with a radially outwardly open circumferential groove communicating with the space and the sleeve is formed with at least one radially throughgoing hole opening into the groove so that the stream passes through the space, groove, and adjustment-sleeve hole. The jaws can be formed with axially extending grooves constituting part of the passage. This keeps these jaws and their guides clean. Furthermore when a self-locking mechanism is provided between the sleeve and chuck body the passage passes through the mechanism so that grit in the mechanism is entrained away by the air stream.

According to another feature of this invention the chuck body has a front end at which the recess opens and which is formed with an axially forwardly projecting and axially centered annular collar of an inside diameter greater than that of the recess and formed with radially throughgoing holes so that the air stream can pass through the collar holes. An annular shield fixed to the chuck body at the front end thereof defines therewith an annular space into which the collar holes open and defines with the chuck body an outwardly open annular gap. The collar is formed with a radially inwardly projecting ridge in part defining the recess and in which the collar holes are at least partially formed.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with

Figure 1:
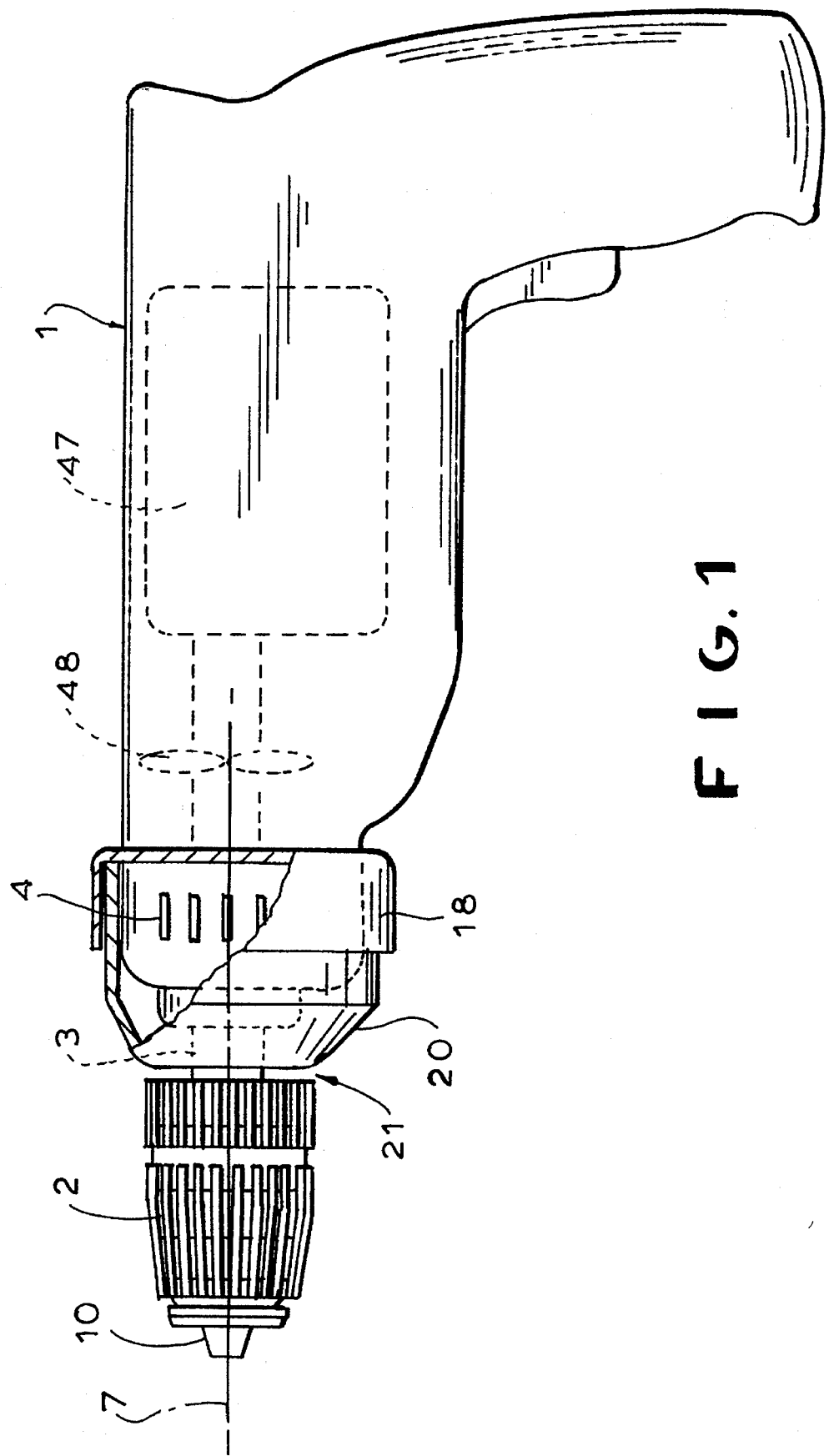
Figure 2:
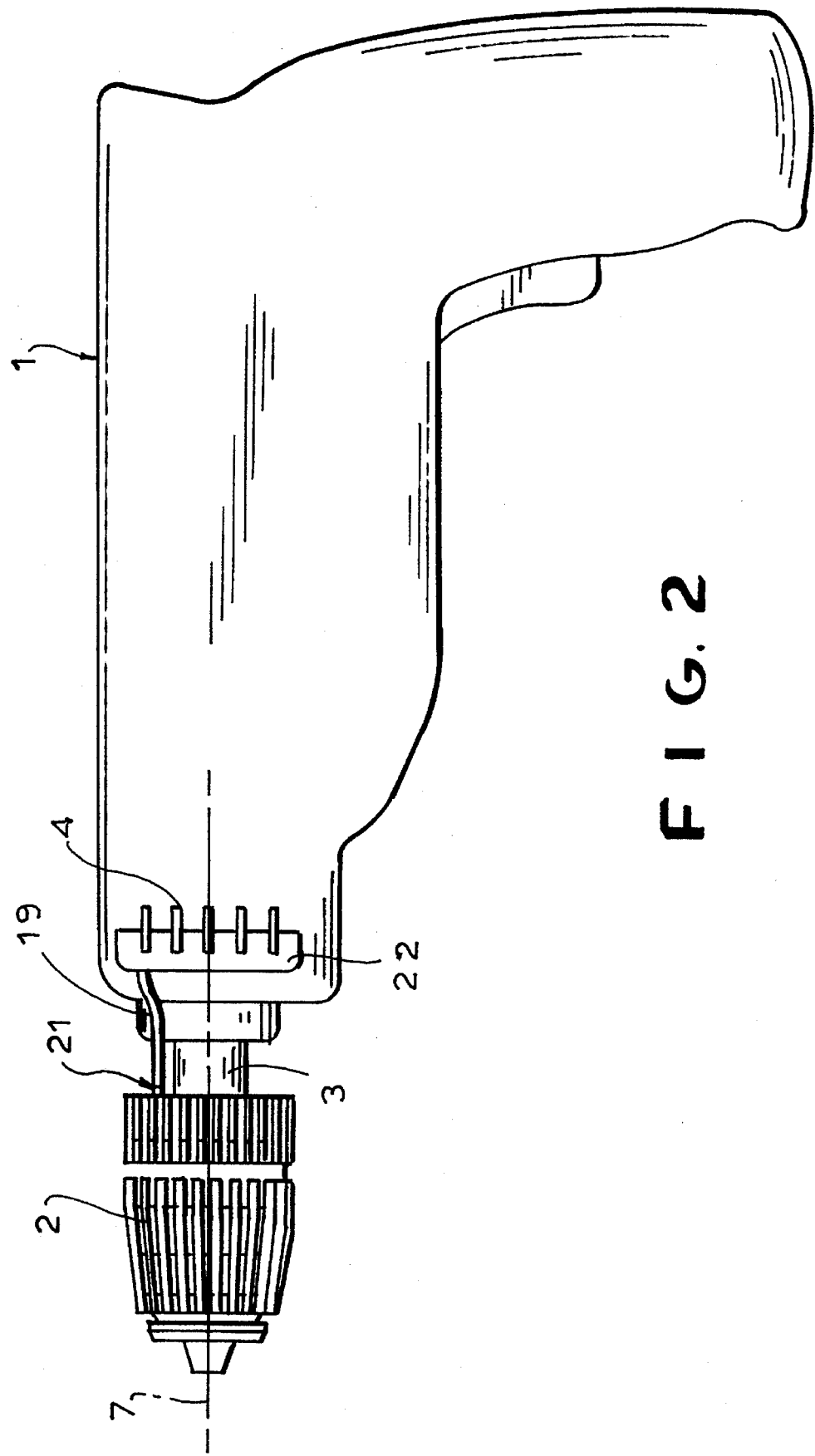
Figure 3:
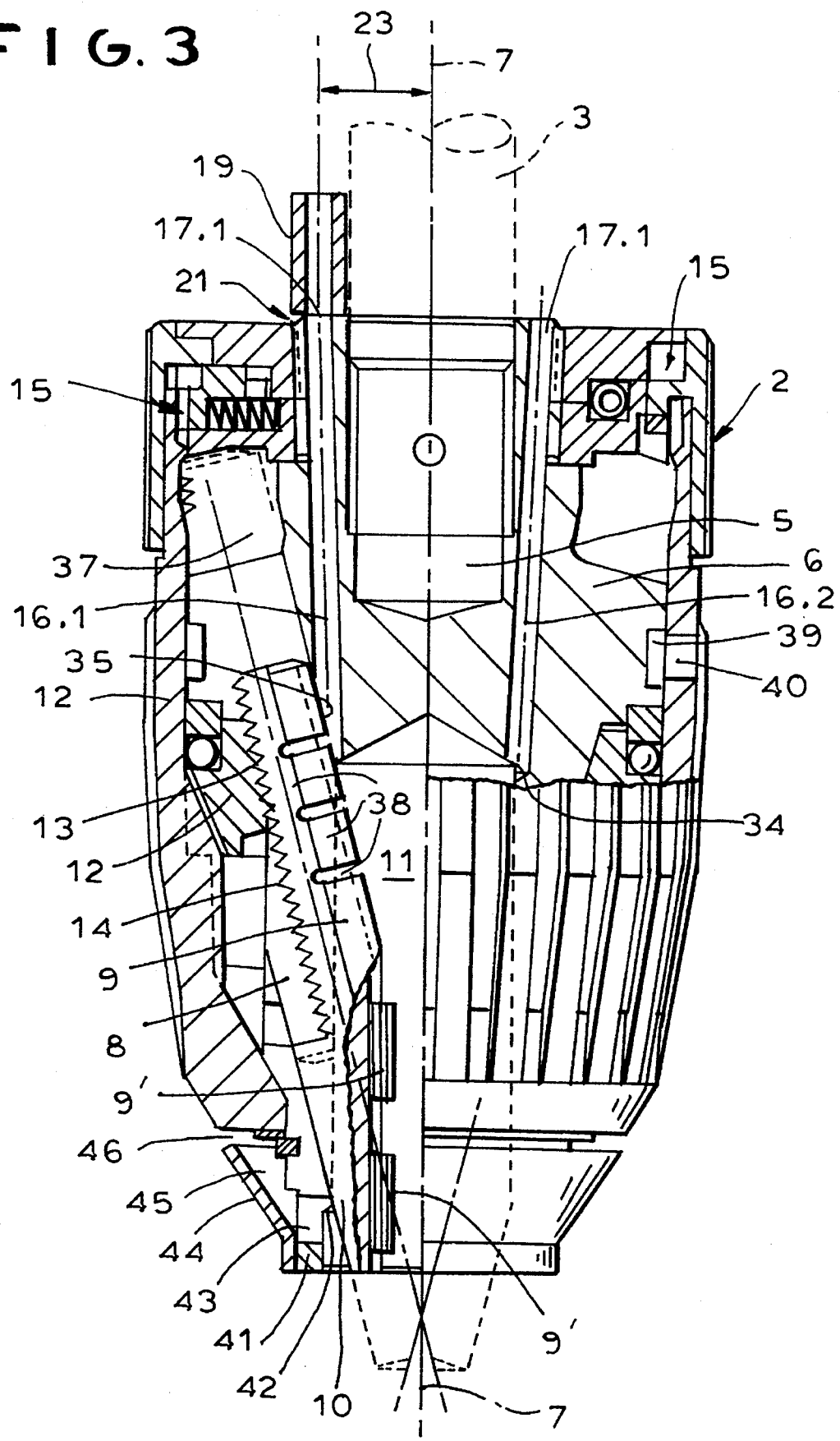
Figure 4:
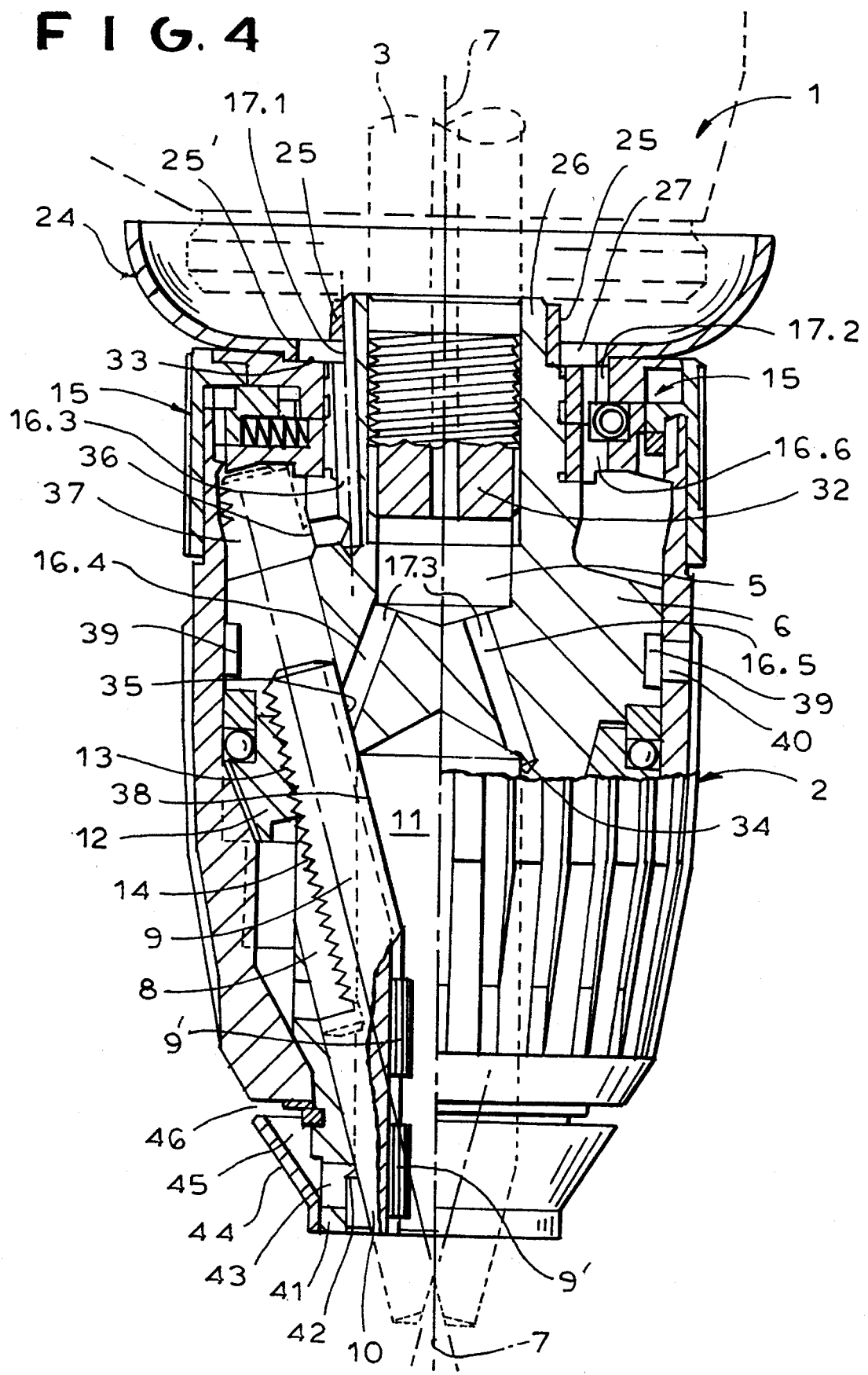
Figure 5:
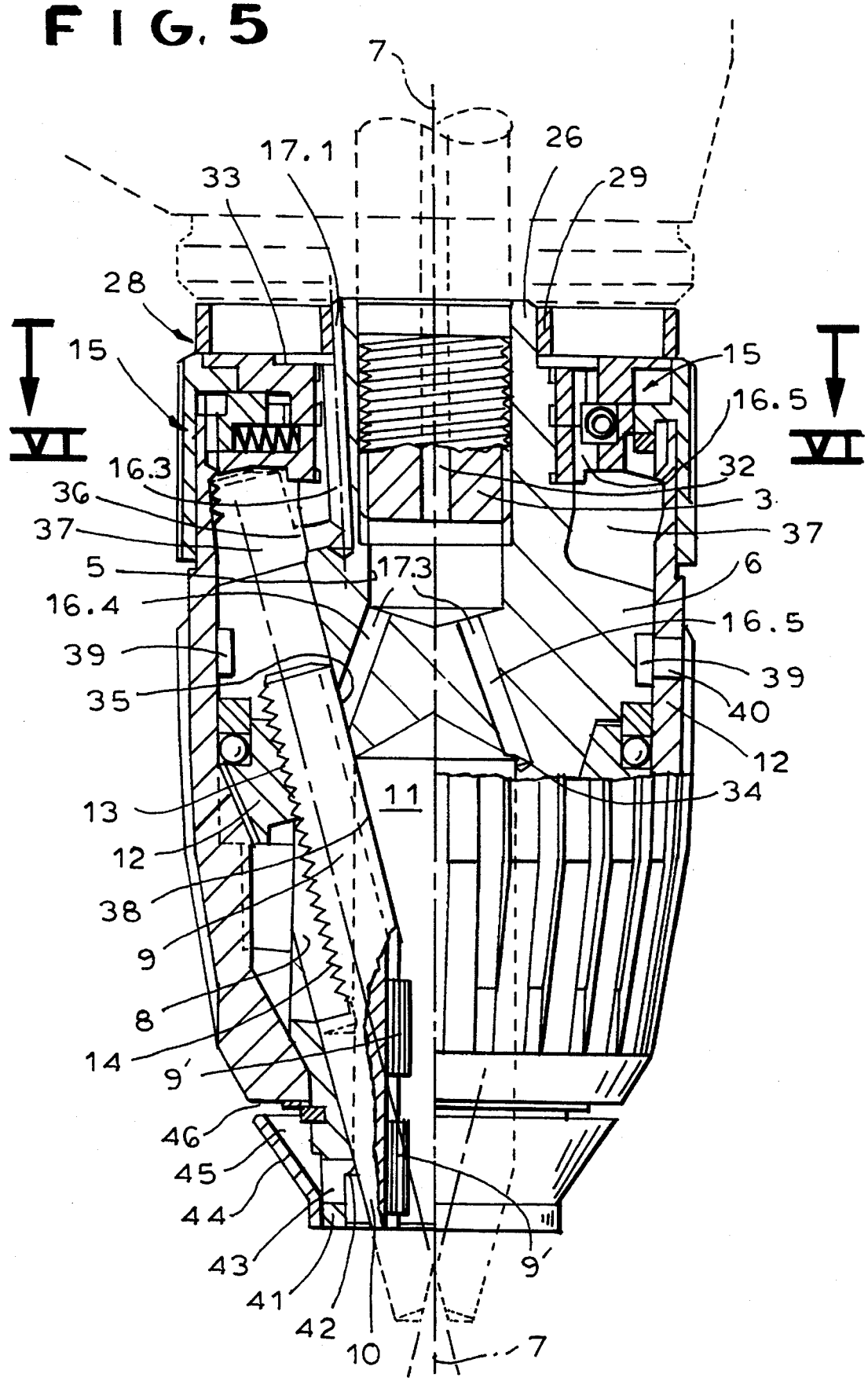
Figure 6:
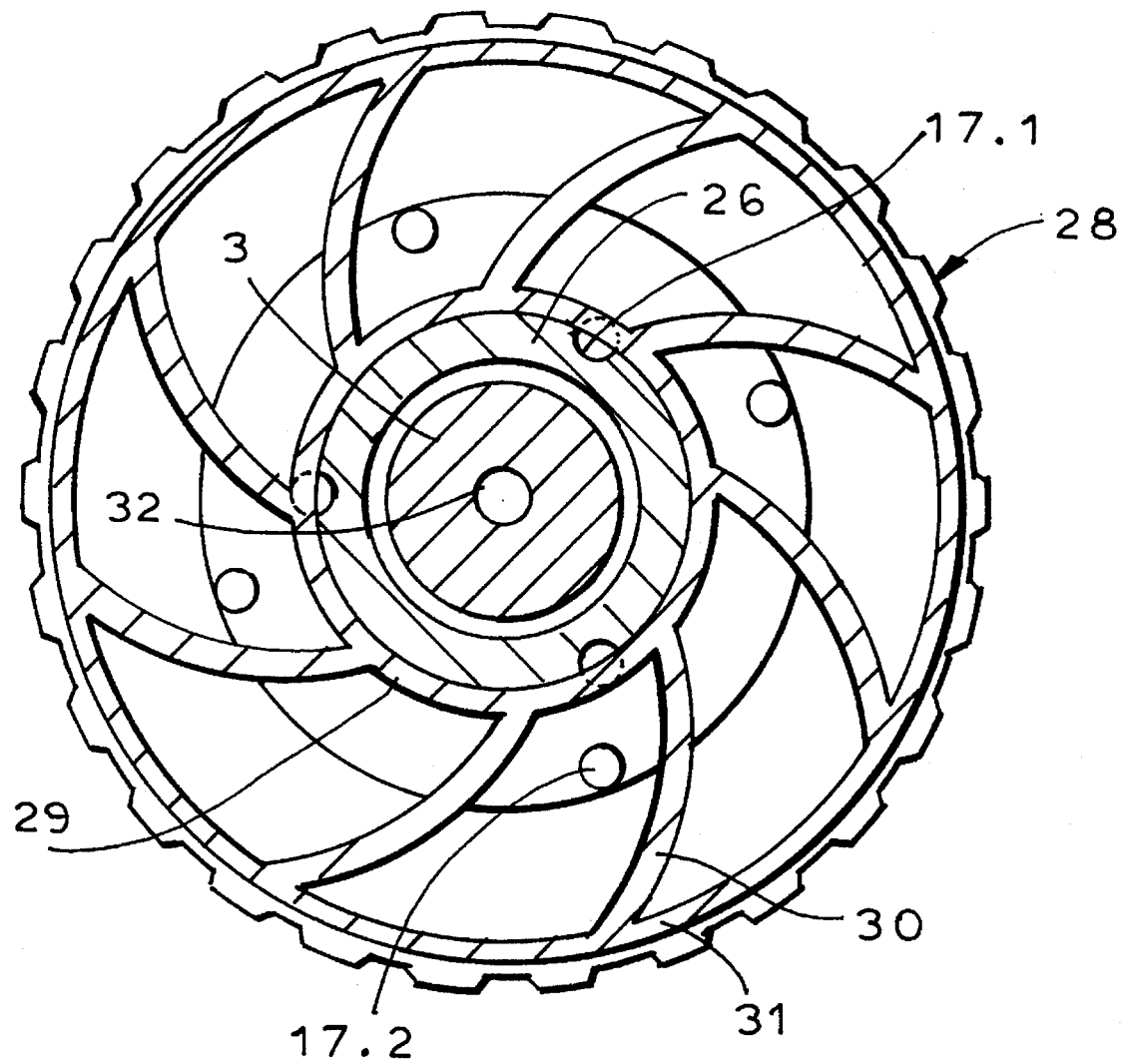

3 reference to one figure but identical to those of another refer to structure that is functionally if not structurally identical. In the accompanying drawing:

FIG. 1 is a partly sectional side view of a drill according to the invention;

FIG. 2 is a view like FIG. 1 of another drill according to the invention;

FIG. 3 is a large-scale axial section through the chuck of the FIG. 2 embodiment;

FIGS. 4 and 5 are views like FIG. 3 of further chucks in accordance with this invention; and FIG. 6 is a section taken along line VI—VI of FIG. 5.

SPECIFIC DESCRIPTION

As seen in FIG. 1 a drive unit 1 of a drill contains a motor 47 having an output shaft 3 centered on and rotatable about an axis 7 and carrying a chuck 2. The drive unit 1 is provided with a fan 48 that creates a stream of air that exits from the unit 1 at front-end vent holes 4. This stream of air can be deflected by a pair of nested cups 18 and 20 to exit at a location 21 at a rear end of the chuck 2. The fan 48 can also operate oppositely to aspirate air through the openings 4 in which case the suction is concentrated by the cups 18 and 20, which are respectively fixed on the unit 1 and shaft 3, at the location 21.

In FIG. 2 a segment-shaped deflector hood 22 is mounted on the drive unit 1 and is connected to a conduit 19 that opens at the location 21 for deflecting the stream of air entering or leaving the ports 4 at this location 21. The location 21 defined by the front end of the tube or conduit 19 is offset from the axis 7 by a radial spacing 23 FIG. 3.

As seen in FIG. 3 the chuck 2 has a body 6 formed centered on the axis 7 with a rearwardly open hole 5 into which the front end of the spindle 3 fits and a front end formed with a recess or hole 11 adapted to receive the shank of a drill bit or the like. Three angled guide holes 8 are angularly equispaced about the axis 7 and open into the recess 11. Each hole 8 slidably receives a respective jaw 9 which is of circular section with an outer chordal flat formed with teeth 14 that mesh with a frustoconical screwthread 13 of an inner part of an adjustment sleeve 12 rotatable about the axis 7 and axially fixed on the chuck body 6. Rotation of the sleeve 12 about the axis 7 in a forward direction advances the jaws 9 axially forward and radially inward to grip a tool in the recess 11 between outer ends 10 of the jaws 9 and opposite rotation of the sleeve 12 moves then axially back and radially out. A locking and self-tightening system 15 of the type described in copending U.S. patent application Ser. No. 08/225,525 filed 11 April 1994 now U.S. Pat. No. 5,435,578 issued 25 July 1995 is provided on the chuck 2. Thus when teeth 9' formed on the jaws 9 bite into the unillustrated tool, the chuck will self-tighten.

According to the invention the chuck body 6 is formed with a plurality of axially extending passages 16.1 and 16.2 having rear ends 17.1 opening at a rear end of the body 6 at the location 21 at a slight spacing from the front end of the deflector tube 19 and at the same radial spacing 23 from the axis 7 as the end of the tube 19. The passage 16.1 has a front end opening at 35 into one of the guide holes 8 at an inner surface thereof. The jaws 9 are formed with axially extending and circumferential grooves 38 so that the air normally being blown into the guides 8 will move axially forward into the recess 11, blowing any chips or oil droplets therefrom, and backward into an annular compartment or space 37

4 formed between the chuck body 6 and the adjustment sleeve 12. The body 6 is formed with a radially outwardly open groove 39 that communicates with the guides 8 and space 37 and the sleeve 12 is formed with a plurality of angularly equispaced and radially throughgoing holes 40 level with this groove 39, so that the air blown into the space 37 will be able to exit therefrom via the groove 39 and holes 40. The passage 16.2 has a rear end 17.1 like that of the passage 16.1 and a front end opening at 34 in the rear end of the tool recess 11.

At its front end the chuck body 6 has an axially forwardly projecting collar 41 centered on the axis 7 and having an inside diameter greater than the diameter of the recess 11, with an inwardly projecting annular ridge 42 defining the front end of the recess 11. Radially throughgoing holes 43 in the collar 41 open into a triangular-section annular space 45 defined by an axially rearwardly flaring shield 44 fixed to the ridge 42. A gap 46 formed between the rear end of the shield 44 allows chips that are blown and thrown centrifugally from the recess 11 through the holes 43 into the space 45 to be ejected radially from the chuck 2. Alternately if the air stream is acting in the recess as suction, the air drawn in through the gap 46, space 45, and holes 43 will entrain chips in the recess 11 and suck them back through the passages 16.1 and 16.2 to the location 21.

In FIG. 4 the chuck body is formed with passages 16.3, 16.4, 16.5, and 16.6. The bores or passages 16.3 and 16.6 extend from rear ends 17.2 at a floor of a groove 33 in the rear end of the chuck to front ends at 36 in the space 37, the former passages being L-shaped and the latter being straight. The passages 16.4 and 16.5 have rear ends opening at 17.3 in the front end of the spindle hole 5 and front ends respectively opening at 34 and 35 into the guides 8 and the rear end of the tool recess 11. The shaft 3 is formed with a central passage 32 leading from a pressure or suction source in the unit 1. The rear end of the chuck 2 carries a rearwardly open and axially centered cup or bell 24 whose inner periphery 25 surrounds a rearwardly projecting ridge 26 of the body 6. This bell 24 surrounds a front end of the unit 1 and has a rim 25' seated in the rearwardly open groove 33 formed in the rear face of the chuck body 6. The rear ends 17.2 of the bores 16.3 and 16.6 open inside this bell or deflector 24 at holes 27 formed therein.

FIGS. 5 and 6 show an arrangement similar to that of FIG. 4 but equipped on the rear face of the chuck body 6 with a fan 28 comprising a cylindrical inner collar 29 fitted snugly to a rearwardly extending axial collar 26 formed on the body 6, a cylindrical outer sleeve or periphery 31 also centered on the axis 7, and a plurality of angled vanes 30 extending between the inner and outer sleeves 29 and 30. Thus here the stream of air for clearing the chuck 2 is formed by this fan 28.

I claim:
1. A drill comprising:
a drive unit having
a front end and
an output shaft projecting from the front end and centered on and rotatable about an axis;
a chuck body fixed on the shaft and formed with
a rear end juxtaposed with the drive-unit front end,
an axially forwardly open tool recess on the axis,
a plurality of angularly spaced and angled guides opening into the recess, and
at least one passage extending between the chuck rear end and the recess and opening backward toward the drive-unit front end;

means including a fan driven by the shaft for creating a moving stream of air traversing a location at the drive-unit front end immediately behind the chuck rear end;

respective jaws displaceable in the guides and having front ends in the recess;

an adjustment sleeve rotatable about the axis on the body;

means including interengaging formations on the sleeve and on the jaws for displacing the jaws radially on rotation of the sleeve about the axis; and means including a deflector at the location directing the air stream into the passage for conducting the air stream through the recess, whereby any chips or the like in the recess will be entrained therefrom by the air stream.

2. The drill defined in claim 1 wherein the drive unit has a housing provided near the chuck with a vent and the fan includes blower means in the housing for expelling air from the housing through the vent, the deflector being arranged between the vent and the rear end of the chuck body.

3. The drill defined in claim 2 wherein the deflector includes a vent hood engaged over the vent.

4. The drill defined in claim 2 wherein the deflector includes a tubular conduit leading from the vent to the rear end of the chuck body.

5. The drill defined in claim 2 wherein the deflector is fixed on the drive unit and ends at a slight spacing axially rearward of the rear end of the chuck body.

6. The drill defined in claim 2 wherein the passage has a rear end opening on the chuck-body rear end offset from the axis and the deflector is a conduit extending from the vent and having a front end fixed relative to the drive unit and opening axially forward, the front end of the conduit and the rear end of the passage being at generally the same radial spacing from the axis.

7. The drill defined in claim 2 wherein the deflector includes a rearwardly open cup fixed to the rear end of the chuck body.

8. The drill defined in claim 1 wherein the fan is mounted on the shaft adjacent the rear end of the chuck body.

9. The drill defined in claim 1 wherein the fan is fixed directly to the rear end of the chuck body.

10. The drill defined in claim 9 wherein the fan has a plurality of blades extending radially of the shaft.

11. The drill defined in claim 10 wherein the fan includes an outer protector ring fixed to outer ends of the blades.

12. The drill defined in claim 1 wherein the fan is inside the drive unit and the passage includes a rear part formed in and extending axially through the shaft and having a rear end opening at the fan and a front part having a front end opening into the recess.

13. The drill defined in claim 1 wherein the passage includes a rear part open axially forward into one of the guides and a front part formed between the guide and the jaw.

14. A drill comprising:
a drive unit having
a front end and
an output shaft projecting from the front end and centered on and rotatable about an axis;

means including a fan associated with the shaft for creating a moving stream of air traversing a location at the drive-unit front end;

a chuck body fixed on the shaft and formed with
a rear end juxtaposed with the drive-unit front end,
an axially forwardly open tool recess on the axis,
a plurality of angularly spaced and angled guides opening into the recess, and at least one passage extending between the chuck rear end and the recess;

respective jaws displaceable in the guides and having front ends in the recess;

an adjustment sleeve rotatable about the axis on the body, the chuck body and adjustment sleeve forming an annular space into which the guides open, the passage being partially formed between the guides and the jaw, whereby the stream passes through the space and along the guides;

means including interengaging formations on the sleeve and on the jaws for displacing the jaws radially on rotation of the sleeve about the axis; and means including a deflector at the location directing the air stream into the passage for conducting the air stream through the recess, whereby any chips or the like in the recess will be entrained therefrom by the air stream.

15. The drill defined in claim 14 wherein the chuck body is formed with a radially outwardly open circumferential groove communicating with the space and the sleeve is formed with at least one radially throughgoing hole opening into the groove, whereby the stream passes through the space, groove, and adjustment-sleeve hole.

16. A drill comprising:
a drive unit having
a front end and
an output shaft projecting from the front end and centered on and rotatable about an axis;

means including a fan associated with the shaft for creating a moving stream of air traversing a location at the drive-unit front end;

a chuck body fixed on the shaft and formed with
a rear end juxtaposed with the drive-unit front end,
an axially forwardly open tool recess on the axis,
a plurality of angularly spaced and angled guides opening into the recess, and at least one passage extending between the chuck rear end and the recess;

respective jaws displaceable in the guides and having front ends in the recess, the jaws being formed with axially extending grooves constituting part of the passage;

an adjustment sleeve rotatable about the axis on the body;

means including interengaging formations on the sleeve and on the jaws for displacing the jaws radially on rotation of the sleeve about the axis; and means including a deflector at the location directing the air stream into the passage for conducting the air stream through the recess, whereby any chips or the like in the recess will be entrained therefrom by the air stream.

17. The drill defined in claim 1, further comprising
self-locking mechanism between the sleeve and chuck body, the passage passing through the mechanism, whereby grit in the mechanism is entrained away by the air stream.

18. The drill defined in claim 1 wherein the chuck body has a front end at which the recess opens and which is formed with an axially forwardly projecting and axially centered annular collar of an inside diameter greater than that of the recess and formed with radially throughgoing holes, whereby the air stream can pass through the collar holes.

19. The drill defined in claim 18, further comprising
an annular shield fixed to the chuck body at the front end thereof and defining therewith an annular space into which the collar holes open and defining with the chuck body an outwardly open annular gap.

20. The drill defined in claim 18 wherein the collar is formed with a radially inwardly projecting ridge in part defining the recess and in which the collar holes are at least partially formed.

* * * * *